(12) United States Patent
Keaton

(10) Patent No.: US 6,564,621 B1
(45) Date of Patent: May 20, 2003

(54) METHOD AND APPARATUS FOR SERVICING, TRANSPORTING, AND HANDLING A RACING CAR

(76) Inventor: James E. Keaton, 14685 Blunts Bridge Rd., Doswell, VA (US) 23047-2161

( * ) Notice: Subject to any disclaimer, the term of this patent is extended or adjusted under 35 U.S.C. 154(b) by 0 days.

(21) Appl. No.: 09/563,445

(22) Filed: May 1, 2000

Related U.S. Application Data

(60) Provisional application No. 60/132,139, filed on May 1, 1999.

(51) Int. Cl.⁷ .............................................. G01M 15/00
(52) U.S. Cl. ......................................................... 73/116
(58) Field of Search ........................... 73/112, 116, 117, 73/117.2, 117.3, 118.1, 121, 122, 123, 124

(56) References Cited

U.S. PATENT DOCUMENTS

| | | |
|---|---|---|
| 2,702,678 A | 2/1955 | Flock |
| 2,811,269 A | 10/1957 | Anderson |
| 3,138,269 A | 6/1964 | Wilkins |
| 3,180,503 A | 4/1965 | Shaw |
| 3,207,264 A | 9/1965 | Melvin |
| 3,675,739 A | 7/1972 | Erlinder |
| 3,927,775 A | 12/1975 | Graupmann |
| 3,931,895 A | 1/1976 | Grimaldo |
| 4,238,959 A | 12/1980 | McCann |
| 4,445,665 A | 5/1984 | Cray |
| 4,531,614 A | 7/1985 | Naegeli |
| 4,750,856 A | 6/1988 | Lapiolahti |
| 5,031,727 A | 7/1991 | Clare |
| 5,431,522 A | 7/1995 | Ross |
| 5,810,544 A | 9/1998 | Wellman |
| 5,829,947 A | 11/1998 | Litten |

*Primary Examiner*—Eric S. McCall
(74) *Attorney, Agent, or Firm*—Robert C. Lyne, Jr.

(57) ABSTRACT

A system for handling and servicing a racing car at a track or other race course employs an open platform for supporting the car by its tires in a horizontal position. The platform supports the car in a carrier vehicle, for example a truck or trailer, when the carrier vehicle is transporting the car to the race course. The platform is also used to unload the car from the carrier vehicle onto the ground and to load the car from the ground into the carrier vehicle. In addition, the platform is used at the race course to elevate the car so that its undercarriage may be conveniently and comfortably accessed through an opening in the platform and thus may be worked on or inspected to prepare or improve the car for racing, by a person who, since he or she is not required to lie on the ground, has full use of both hands and ergonomically favorable body position and leverage.

14 Claims, 10 Drawing Sheets

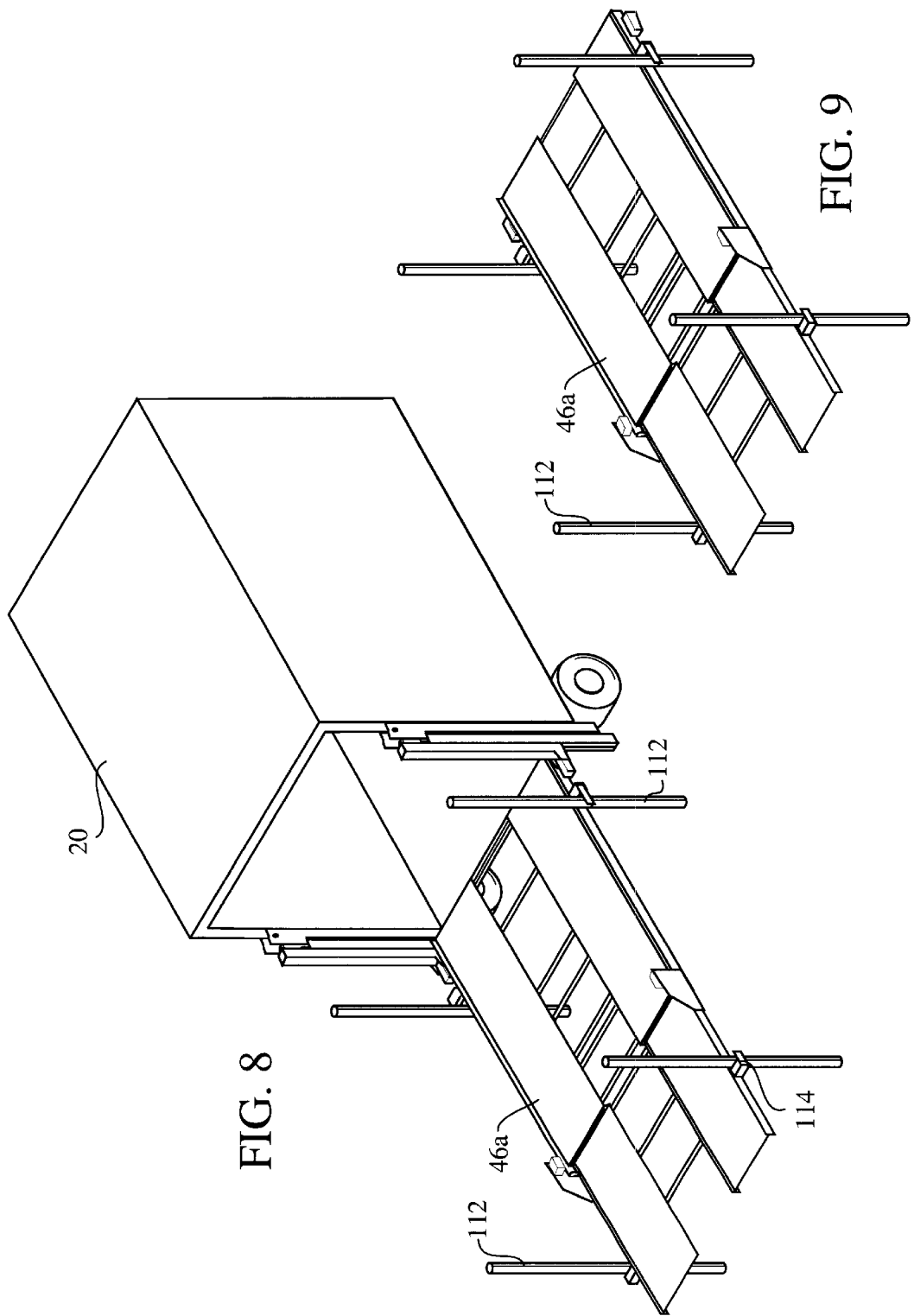

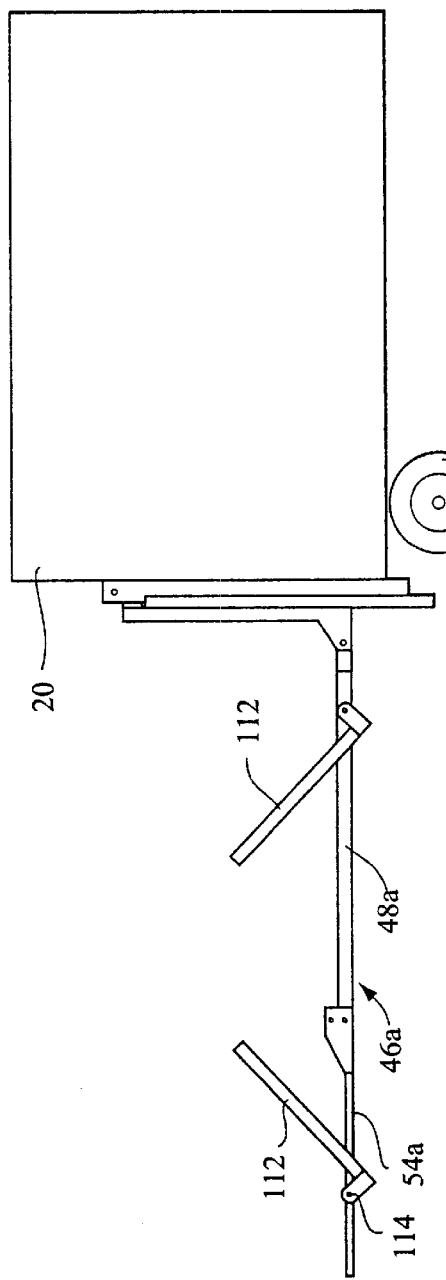
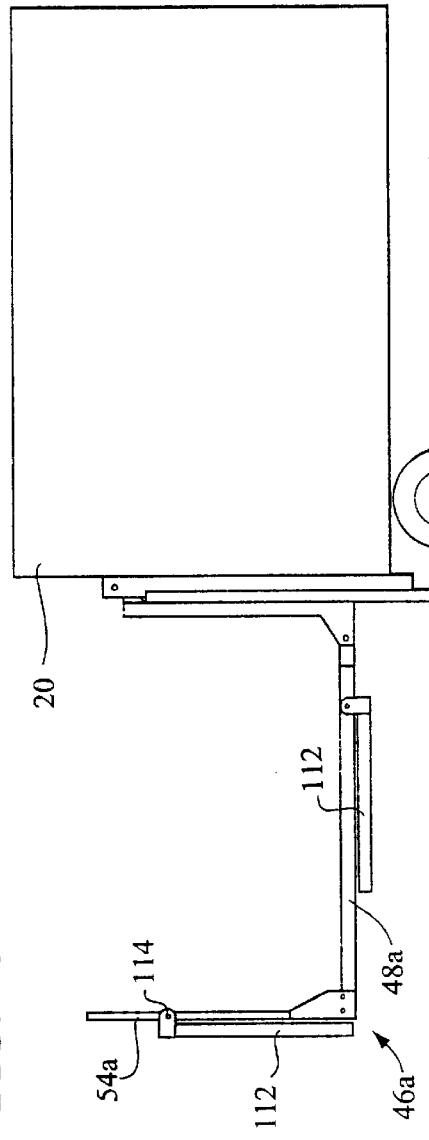
FIG. 10
FIG. 11

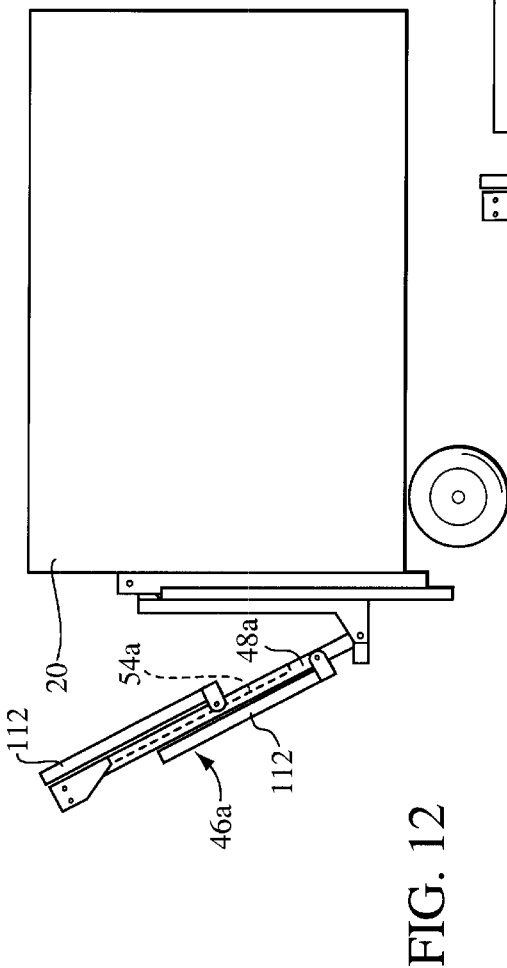
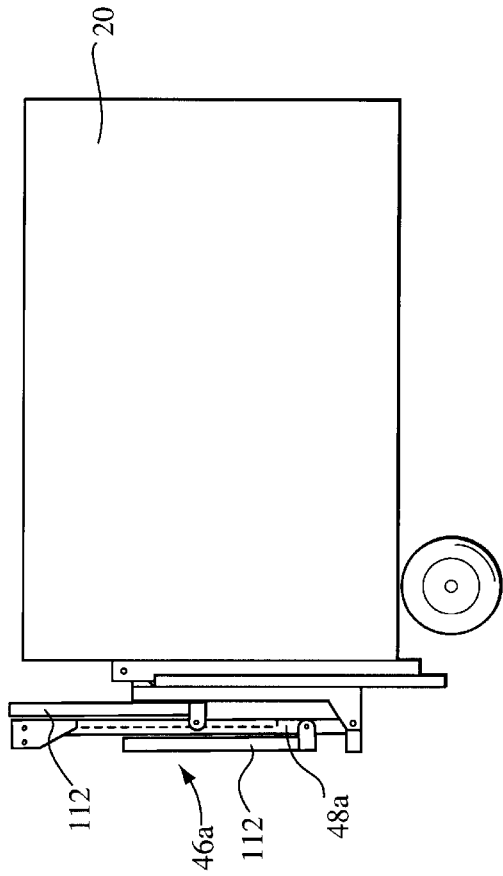
FIG. 12
FIG. 13

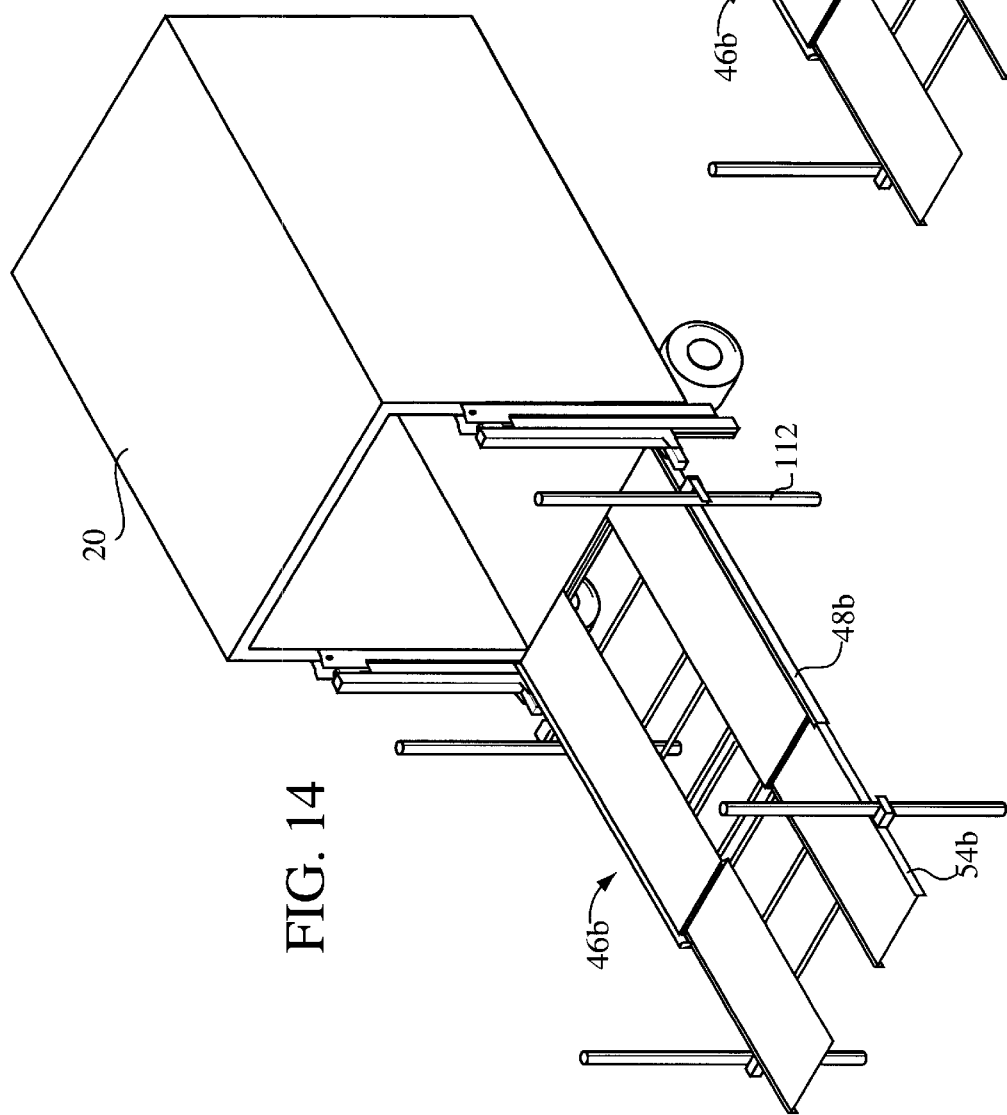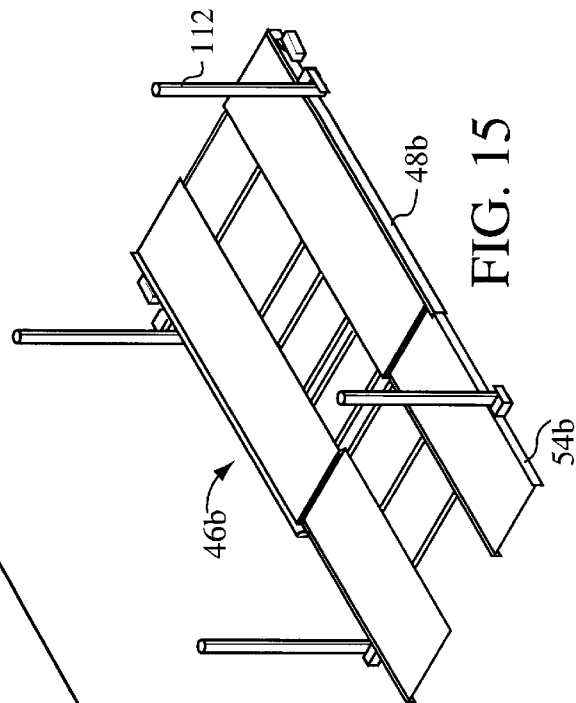

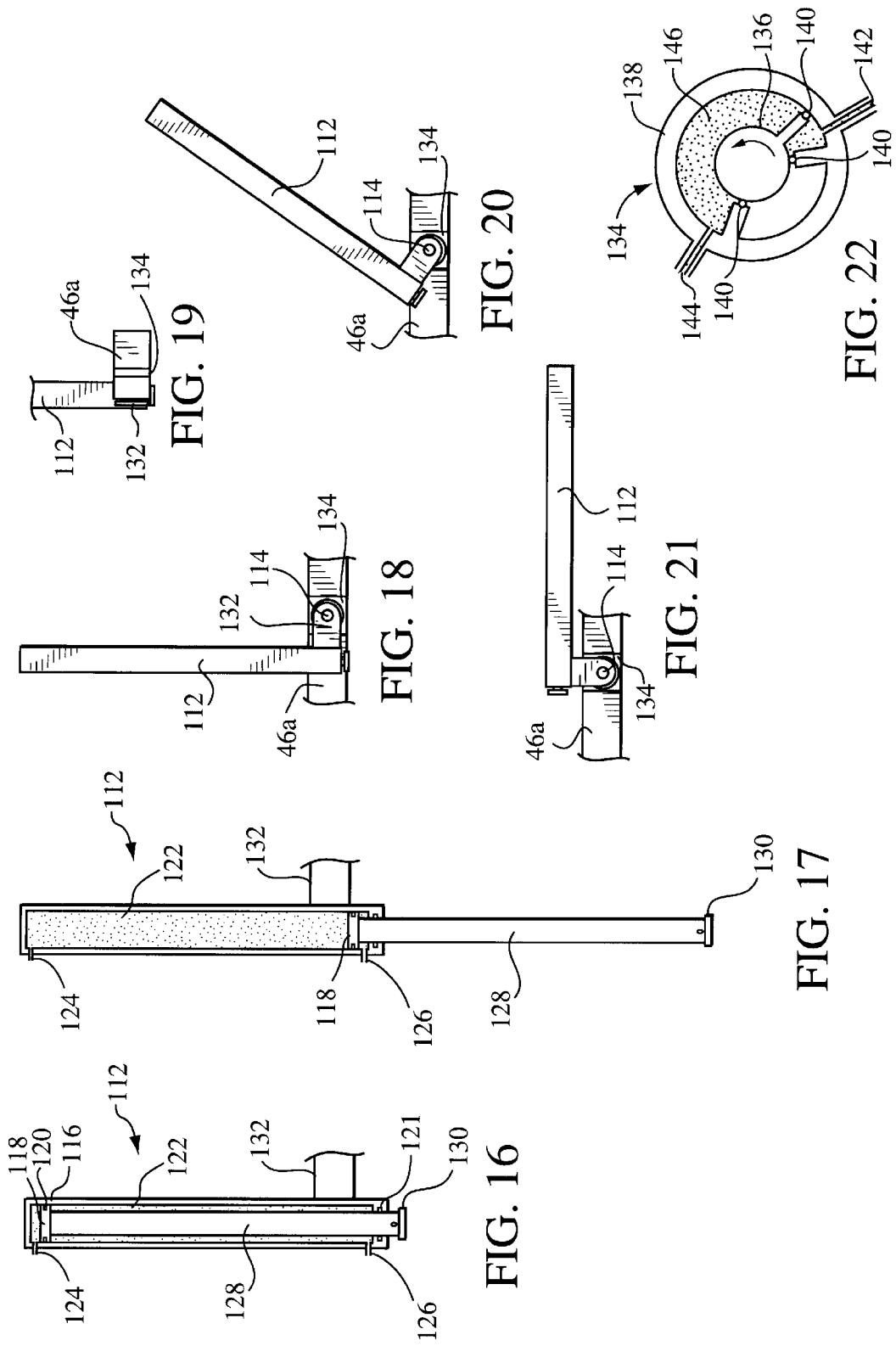

METHOD AND APPARATUS FOR SERVICING, TRANSPORTING, AND HANDLING A RACING CAR

RELATED APPLICATIONS

This application discloses and claims subject matter which is disclosed in copending provisional patent application Ser. No. 60/132,139, filed May 1, 1999 and titled "Methods and Apparatus for Preparing an Automobile for Racing".

TECHNICAL FIELD

This invention pertains to the field of automobile racing and involves concepts useful in the fields of vehicle lifts, transporting automobiles in carrier vehicles, and loading and unloading carrier vehicles.

BACKGROUND ART

Automobile racing is an extremely popular sport and is becoming more so. In 1998 NASCAR alone had 17 of the 20 best-attended sports events in America, each with an attendance of over 100,000 spectators. Cable television coverage of these events has greatly enlarged the audience, which is continuing to expand by millions of viewers each year. Other types of automobile racing, for example, Grand Prix road racing, drag racing, and endurance racing, are also popular throughout the world. The U.S. retail market for products made specifically for racing has been estimated at $1.5 billion annually. Equally impressive is the number of actual participants in auto racing. It was recently estimated that at least 385,000 people competed in an organized automobile race at least once in 1998.

Teams and individuals who participate in auto racing vary greatly in terms of equipment sophistication, financial and personnel resources, driver skills, and support crew proficiency. While the larger and better-financed competitors receive most of the publicity, a far greater number receive little, or no publicity. For many of these participants, responding to the varied challenges presented by the competition provides much of the motivation. If a team or individual is unable to compete one way, they must be resourceful enough to devise other ways to compete, while staying within their particular limitations as well as the rules.

One of these challenges is the efficient use of time and personnel at the track. This challenge is particularly demanding during a racing event or in on-site preparation for a racing event. It is also a factor in preparation and development of the automobile and driver in order to optimize their respective performances for future racing events, since "track time" is usually limited and costly. As best stated by Carroll Smith, "Nothing is ever in such short supply at a race track as time . . . There is never enough time . . . Time lost during practice or qualifying is lost forever and time wasted during a day of testing is expensive and frustrating. Especially at one of the $1,000 per day tracks". (Tune to Win, 1978, page 161. Mr. Smith also authored Engineer to Win in 1984. Both books are incorporated herein by reference.)

Competing for track time are numerous procedures which require accessing and working on or inspecting the undercarriage of the racing car, often repeatedly and with unavoidable interruptions for test driving on the track. These procedures generally fall into three categories: chassis tuning, safety, and inspection.

Chassis tuning is essential, if the racing car is to even approach its maximum performance capabilities. While the car with the best chassis tuning may not always win the race, chassis tuning often determines the winner, will always determine the winner when other factors are equal, and almost always determine a loser if ignored. Examples of chassis tuning procedures are: diagnosing and correcting chassis binding; disconnecting linkages for front or rear anti-sway bars and exchanging an anti-sway bar for one of a different torsion rate; determining that the rear end of the car is square to the chassis or at a desired offset (i.e., "stringing the car"), changing one or more springs, struts, or shock absorbers to ones with more desirable mechanical properties, setting the front and/or rear ride height; adjusting the front and/or rear camber to the desired degree setting; adjusting the front for camber gain and cross percentages of caster, adjusting the front and/or rear for toe-out or toe-in; minimizing bump steer; adjusting jack screws or wedges; adjusting Ackerman steering, if the car is so equipped; measuring and optimizing the scrub radius of tires; adjusting control devices for rear axle performance (e.g., panhard bar or Watts link); adjusting rear torque arms; adjusting other devices relative to rear axle performance (e.g., to optimize anti-squat characteristics, rear-steering characteristics, rear camber and rear toe-in); determining optimum weight distributions on each of the car's wheels (i.e., "scaling the car"). Chassis tuning frequently uses known alignment tools, for example, turn plates, caster/camber gages, toe-in devices, and devices for measuring linear distance. Chassis tuning is a process of balancing many interrelated variables to provide optimum handling characteristics and thus ultimate racing performance.

Safety procedures include the following: inspecting fasteners and tightening as necessary; inspecting for oil leaks, gas line leaks, shock absorber malfunctions and correcting as necessary; inspecting brake lines for signs of chafing or failure and correcting as necessary; inspecting brake pads and rotors and servicing as necessary; inspecting the flywheel scatter-shield device; inspecting the drive shaft safety hoop; inspecting for damage or undesirable changes resulting from a track incident.

Routine maintenance procedures include the following: changing engine oil; inspecting and/or changing transmission lubricants; inspecting and/or changing final drive lubricants; checking and maintaining the integrity of the exhaust system.

Racing cars are transported to racing events and elsewhere by a variety of means. One such means is a tractor-trailer combination in which an enclosed, two-level trailer carries at least four cars. The cars are loaded and unloaded by an elevatable horizontal platform which is supported by two sets of diagonal chains at the rear of the trailer when in use and folds against the rear of the trailer when not in use. Such transporters are depicted in Old Car Trader, July 1998, pages Y-28 and Y-29, in the advertisements of VIP Transport, Inc. and Exotic Car Transport. I believe that these particular platforms fold about two hinges, in an arrangement similar to that shown by Erlinder U.S. Pat. No. 3,675,739 on a truck.

Also known are mobile lifts for servicing or transporting automobiles. See, for example, Grimaldo U.S. Pat. No. 3,931,895, Cray U.S. Pat. No. 4,445,665, Lapiolahti U.S. Pat. No. 4,750,856, and Wellman U.S. Pat. No. 5,810,544. An example of another, commercially available lift is depicted in Hemmings Motor News, September 1999 issue, page 8879, in an advertisement by Autolifters of America, Inc., Wichita, Kans.

Stationary lifts or grease pits are rarely, if ever, available for the use of contestants at a track. There are currently several methods of elevating racing cars at tracks so that they can be worked on and inspected. One such method utilizes a lever, for example a first class lever with a long handle at one end, a load-supporting surface at the other end, and in between a fulcrum which bears on the pavement. A second method involves four pressurized gas-actuated jacks which are mounted on the racing car itself A third method consists of jacking up one side or end of the car at a time by one or more jacks which, though having a specialized and sophisticated design, operate much the same way as ordinary garage or vehicle-carried jacks. The first two methods are fast and are often used for raising a car several inches during a race for limited purposes, for example changing tires, but are not suitable for allowing working under the car for most purposes, because of obvious space, stability, and safety limitations. The third method can raise the car somewhat higher, more so if jackstands are used, but is slower and still cannot provide the access and stability made possible by more robust conventional lifts.

Each of these methods has the further disadvantage that raising the car takes the sprung weight of the car off the suspension, so that repairs, modifications, and adjustments which affect the handling of the car must be made under artificial, "no-load" conditions. Moreover, lowering the car back down does not necessarily, and probably will not, return handling-affecting parameters to a condition which allows a useful comparison with their "original condition" that existed just prior to the raising, repair, modifying, or adjustment. Put another way, in these prior art methods the mere acts of raising and lowering change these parameters. Sometimes crew personnel bounce the car up and down while rolling it backward and forward after it has been lowered, in an effort to achieve a comparable condition. This remedy is not reliable; for example, the wheels may not be able to assume their original position without having been driven at track speed with the weight of the driver. Alternatively, the car may be driven on the track again in an attempt to achieve the desired comparable suspension condition, but this remedy involves additional time and expense and may itself introduce some further variable; for example, the suspension may reflect the most recent track condition, vehicle speed, or driver action.

Some racing teams undoubtedly employ sophisticated lifts at their permanent facilities at home, and these lifts may have some degree of mobility. I am not, however, aware of a mobile lift which has been used at a track to (1) raise the car in the horizontal position (with the exception of the on-board jacks mentioned above), (2) raise the car sufficiently high to allow its undercarriage to be worked on and inspected by a person who is not lying on the ground, or (3) raise or lower the car without unloading its suspension. If such use of a mobile lift has taken place, I suspect that the reason it was not adopted for widespread use was that the lift failed to meet one or more requirements for use at a track. These requirements, in my opinion, include a combination of at least two of the following, in no particular order: mobility, compactness, ease and speed of operation, ability to be operated by one or two people, stability, safety, ease and speed of setup and takedown, rigidity, ability to duplicate previous conditions, reliability, versatility, durability, low cost, and ability to accept racing cars which, because of their ground-effects fairing designed to come as close as possible to the surface of the track, have minimal ground clearance.

SUMMARY OF THE INVENTION

The invention addresses these requirements and is intended to meet them more successfully than the prior art, by meeting more of the requirements and by meeting individual requirements in a superior manner.

An object of the invention is to provide a mobile lift system which may be used at a track or other race course for servicing a racing car in a horizontal elevated position, in which position the undercarriage of the car may be comfortably and efficiently accessed through an open platform by a person who, since he or she is not required to lie on the ground, has full use of both hands and ergonomically favorable body positioning and leverage.

Another object of the invention is that the system and the racing car may be transported by road to and from the course in a single carrier vehicle, such as a truck or trailer.

Another object of the invention is that the system may be used to load and unload the racing car into and from the carrier vehicle.

Another object of the invention is that the system be capable of elevating the racing car for service in a standalone mode, in which the platform is separated from the carrier vehicle, thereby conforming to the space limitations at most race courses.

Another object of the invention is that the system allow the racing car to be driven from the ground onto the platform and vice versa.

Another object of the invention is that the platform support the racing car by its tires, so as to permit the racing car to be worked on, measured, and tested without taking the sprung weight of the car off its suspension.

Another object of the invention is to use the system to simulate, on a racing car supported by the platform, dynamic loads the car is likely to encounter on the race course.

The present invention is a system, including methods and apparatus, for handling and servicing a racing car at a track or other race course. The inventive system employs an open platform for supporting the car by its tires in a horizontal position. The platform supports the car in a carrier vehicle, such as a truck or trailer, when the carrier vehicle is transporting the car to the course. The platform is also used to unload the car from the carrier vehicle onto the ground and to load the car from the ground into the carrier vehicle. In addition, the platform is used at the course to elevate the car so that its undercarriage is accessible through an opening in the platform and thus may be worked on or inspected to prepare or improve the car for racing.

BRIEF DESCRIPTION OF THE DRAWINGS

FIG. 8 is a perspective view of a carrier vehicle, stationary mounting assembly, and platform assembly according to a variation of the invention having folding leg units, with the platform in the fully up position.

FIG. 9 is a view similar to FIG. 8, with the platform assembly detached from the carrier vehicle.

FIGS. 10, 11, 12, and 13 are views similar to FIG. 8, with the platform in different sequential positions as it is being collapsed for transport.

FIG. 14 is a perspective view of a variation of the invention shown in FIG. 8 in which the front platform section and the rear platform section slideably engage each other, with the platform in the fully up position.

FIG. 15 is a view similar to FIG. 10, with the platform assembly detached from the carrier vehicle and the platform in the fully down position.

FIG. 16 is a sectional side view of a leg unit in the retracted position.

FIG. 17 is a view similar to FIG. 16 with the leg unit in the extended position.

FIG. 18 is a fragmentary side view of a leg unit, with the leg in vertical, operating position perpendicular to the plane of the platform.

FIG. 19 is a fragmentary, sectional rear view of the leg unit shown in FIG. 18.

FIG. 20 is a view similar to FIG. 18, with the leg unit in a partially rotated position.

FIG. 21 is a view similar to FIG. 18, with the leg unit in a fully rotated, horizontal position parallel to the plane of the platform.

FIG. 22 is a schematic, sectional view of a Rotac hydraulic motor.

FIGS. 1, 2, and 4 are drawn to the same scale, with the distance between front hinge 40 and rear hinge 42 in FIG. 1 representing 128 inches. FIG. 3 is also drawn to scale, with track 84 being 4 inches square in cross section.

DESCRIPTION OF THE PREFERRED EMBODIMENT

The following terms will be used throughout this application in accordance with these definitions, unless a different interpretation is required by the context.

The term "bed", as applied to a truck or trailer, refers to a surface for supporting a car or other load being transported. A vehicle may have more than one bed.

The term "force multiplying mechanism" means a hydraulic or mechanical device which employs a mechanical advantage to produce a multiplied pushing or pulling force, for example a hydraulic lift mechanism.

The terms "race" and "racing" refer to a race involving competition, either directly (i.e., head-to-head) or by comparison of recorded elapsed times, between automobiles with drivers.

The terms "racing automobile" and "racing car" refer to an automobile, truck, or other vehicle used in racing or designed, adapted, or otherwise intended for use in racing.

The term "roll" and cognate terms, as applied to moving a car on and off a platform, refer to driving, pushing, pulling, or winching the car.

The terms "track" and "course" refer to any closed circuit or open circuit automobile race course, including circular tracks, oval tracks, figure eight tracks, road racing courses, drag strips, and endurance courses used by an automobile and driver either for racing or for development or preparation for racing.

The term "work on" and similar terms including "work" with reference to something done to a vehicle include modification, repair, adjustment, tuning, measurement, and routine service such as changing oil and lubricating. The term "service" and cognate terms mean working on or inspecting, including non-routine as well as routine maintenance.

The term "ground" means any substantially flat, solid base, including earth, pavement, floor, or a surface thereon.

The terms "front" and "rear" will be used with reference to the carrier vehicle. That is, the "front" of the platform or car will be closest to the steering wheel of the carrier vehicle when the platform or car is being transported, loaded, or unloaded.

Figure 1:
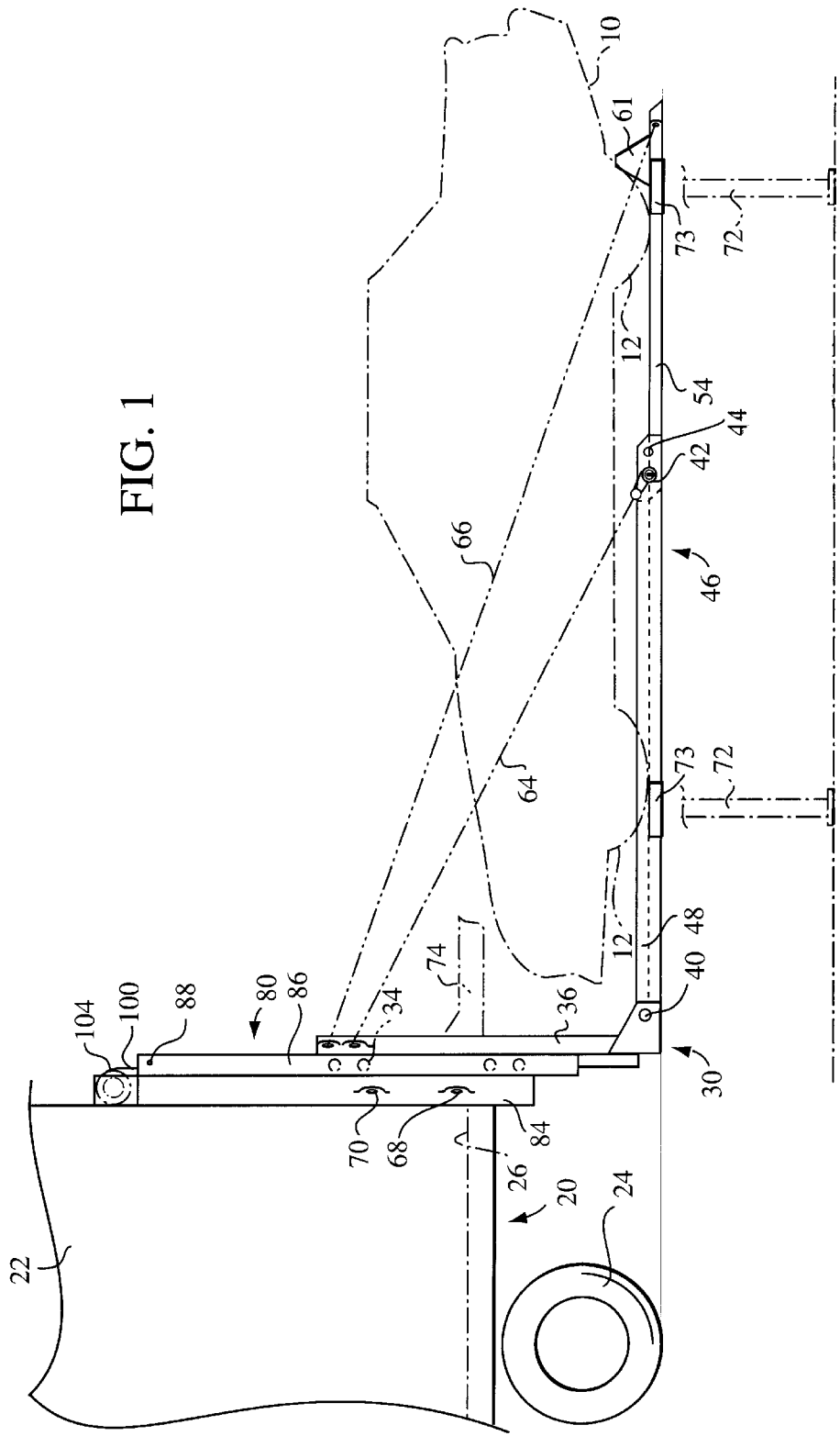
FIG. 1 is a left side view of a carrier vehicle, stationary mounting assembly, and movable platform assembly according to the invention, with the platform in the horizontal, fully down position.

As shown in FIG. 1, movable platform assembly 30 is in the fully down position. Racing car 10 with tires 12, shown in phantom lines, is resting on platform 30. Platform assembly 30 is slideably connected to stationary mounting assembly 80. Mounting assembly 80 is fastened to carrier vehicle 20, which is a truck or a trailer with enclosed body 22, rear wheel 24, and floor or bed 26.

Figure 2:
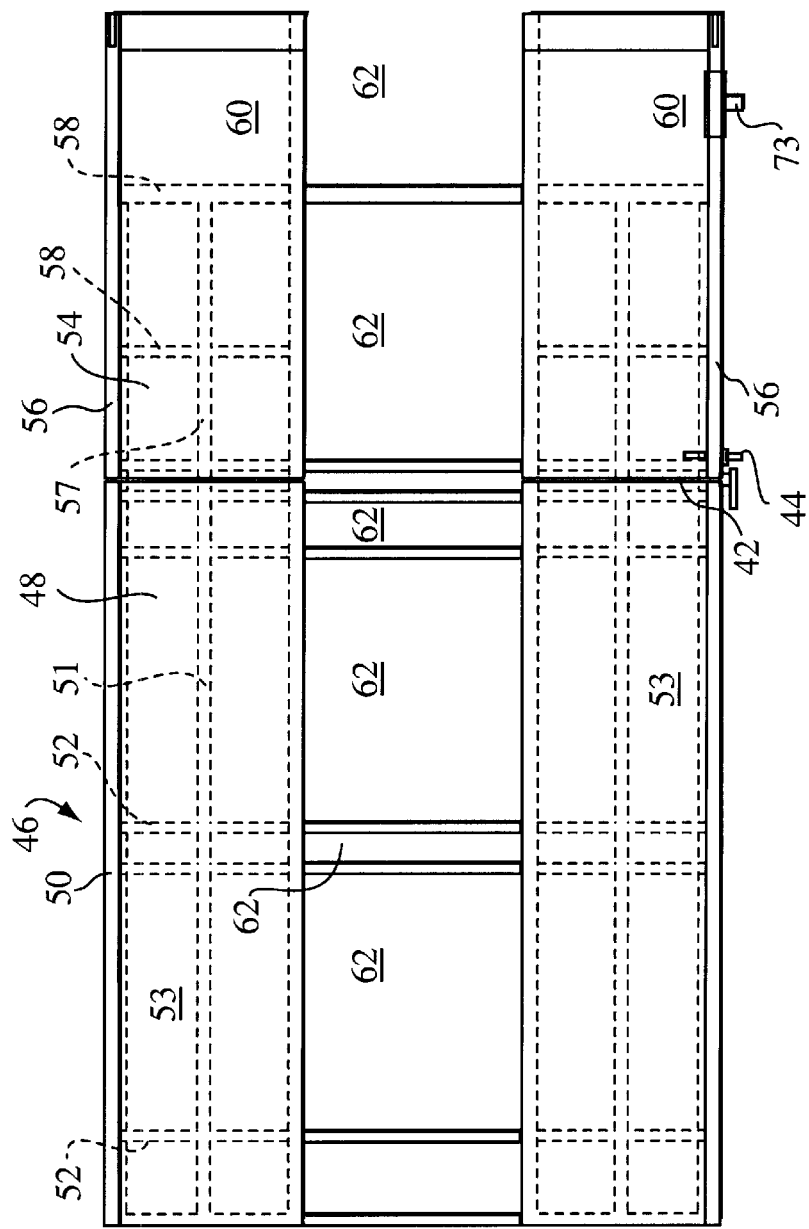
FIG. 2 is a fragmentary top view of the platform.
Figure 3:
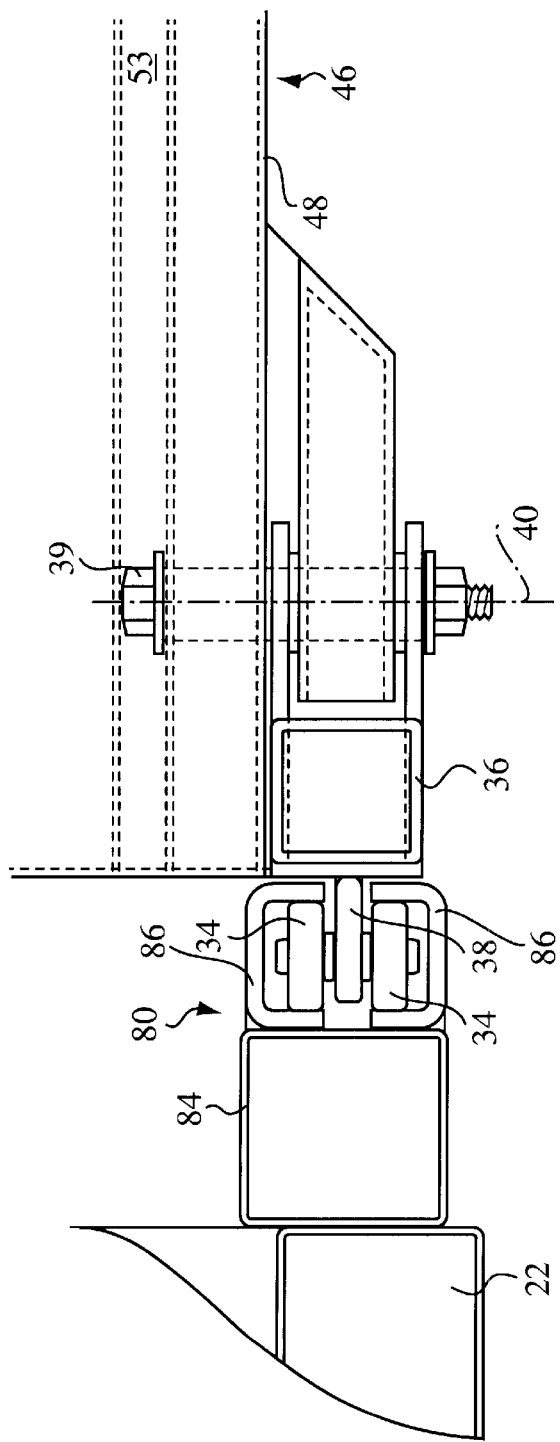
FIG. 3 is a fragmentary detail of the top view of FIG. 1, showing the carrier vehicle body, the left stationary vertical track member, and the left movable vertical rail.

As shown in FIGS. 1 and 3, platform assembly 30 comprises vertical rail 36, which consists of a square tube welded to spine 38. Rollers 34 are attached to the ends of short horizontal axles extending through spine 38. Near its bottom end, rail 32 is detachably and pivotally connected to platform 46 by bolt 39, so as to form horizontal front hinge 40. Platform 46 is shown in FIG. 1 to be resting on the ground in its fully down position. Platform 46 comprises two sections—front section 48 and rear section 54. As shown in FIG. 2, front platform section 48 is formed of side members 50, interior longitudinal members 51, and transverse members 52 welded together, while rear platform section 54 is formed of side members 56, interior longitudinal members 57, and transverse members 58 welded together. As shown in FIG. 2, front and rear treads 53, 60 are supported by the side members, longitudinal members, and transverse members, and extend between the side members and the inboard longitudinal members. Wheel stops 61 are removably fastened by bolts or pins to rear treads 60 see FIG. 1. Front platform section 48 is permanently and pivotally connected to rear platform section 54 at horizontal rear hinge 42. Rear hinge locking pin 44 locks sections 48 and 54 together when they are in the extended, horizontal, coplanar position, which is shown in FIG. 1.

The above-described structure of platform 46 provides openings 62, some of which are relatively large. With the exception of transverse members 52 and 56, openings 62 constitute the entire central portion of platform 46 along its longitudinal axis. Openings 62 provide for unrestricted access to the undercarriage of a racing car, and should be sufficiently large and suitably positioned to provide space for the tools being employed and for the removal and replacement of components, for example a transmission. It is preferred that openings 62 have a total area which is at least 35 percent of the area of platform 46. This percentage is approximately 42 percent in the embodiment depicted in FIG. 2.

As shown in FIG. 1, tensioned front chain 64 and rear chain 66 extend diagonally from the upper part of rail 36 to rear hinge 42 and the rear of platform 46, respectively, so as to support platform 46 in its extended position. These chains and the other structure that has been described are capable of supporting the combined weight of the platform and the racing car in any vertical position, including the platform's fully up position shown by phantom lines 74.

Four extendible legs or jacks 72 support platform 46 in the fully up position 74. The bases of jacks 72 rest on the ground at the front-to-rear locations shown in FIG. 1, but are shown in FIG. 1 as being below ground level in order to avoid undue clutter in the drawing. Jacks 72 detachably engage jack clips 73, which themselves are detachably bolted or pinned to platform 46. In the embodiment shown in FIGS. 1 through 7, jacks 72 are used for safety and leveling.

Returning now to the front, platform assembly 30 is slideably connected to mounting assembly 80, which is fastened to carrier vehicle body 22 by bolts (not shown). As shown in FIG. 3, stationary mounting assembly 80 is formed of square tube 84 welded to opposed channels 86. Rollers 34 of platform assembly 30 ride within channels. Stop pin 88, which spans mounting assembly 80 near its upper end, limits upward travel of rail 32 and defines fully up horizontal position. Mounting assembly 80 has grab chain ring 68 and holding chain ring 70, which are used only when the platform is being folded, as will be described later; cables may be used instead of chains.

Figure 4:
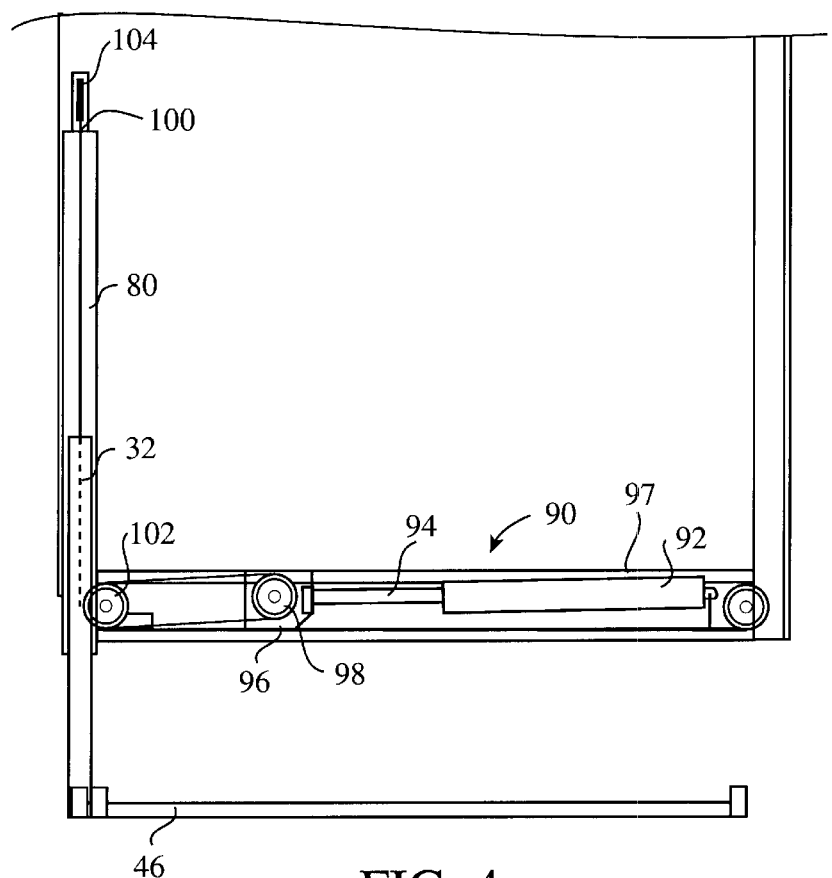
FIG. 4 is a rear view of the carrier vehicle, stationary mounting assembly, and movable platform shown in FIG. 1, with the force-multiplying lift mechanism exposed.
Figure 5:
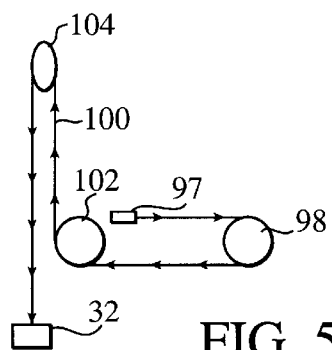
FIG. 5 is a schematic view corresponding to FIG. 4 and showing the path of the cable for raising and lowering the left side of the platform assembly.
Figure 6:
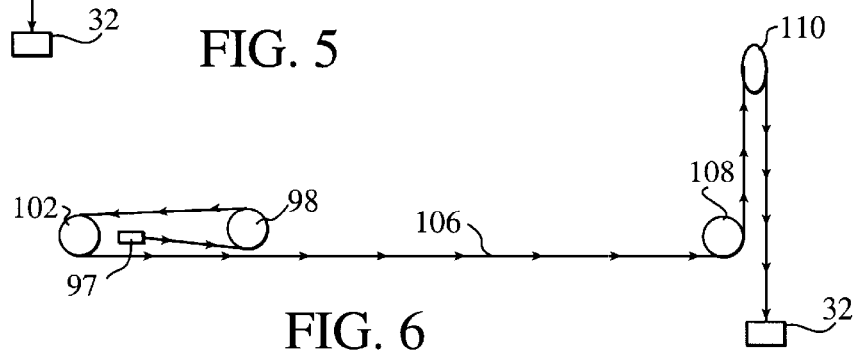
FIG. 6 is a schematic view corresponding to FIG. 4 and showing the path of the cable for raising and lowering the right side of the platform assembly.

As shown in FIG. 4, the motive force for raising platform 46 is provided by force-multiplying lift mechanism 90, which includes hydraulic cylinder 92 and ram 94. Ram 94 is connected to movable slide 96, which slides within stationary frame 97 and carries two lower pulleys 98 on a common axle. As shown in FIGS. 4 and 5, left cable 100 is fixed at one end to stationary frame 97, then passes around one pulley 98, around one of two stationary lower pulleys 102 on a common axle, over left sheave 104, and down to the upper end of left vertical rail 32, where its other end is secured. Correspondingly, as shown in FIGS. 4 and 6, right cable 106 is fixed at one end to stationary frame 97, then passes around the other pulley 98, around the other stationary lower pulley 102, around right stationary lower pulley 108, over right sheave 110, and down to the upper end of right vertical rail 32, where its other end is secured. The pulleys and sheaves described are mounted for rotation on horizontal axles.

To raise platform 46, hydraulic fluid from the hydraulic system of carrier vehicle 20 is introduced to cylinder 92, which retracts ram 94, moves pulleys 98 to the right, and increases the length of horizontal cable shown in FIGS. 4, 5, and 6. Platform 46 is lowered by gravity, with the rate of descent being controlled by modulating the exit of hydraulic fluid from cylinder 92.

With the exception of the raising and lowering apparatus just described, platform assembly 30 and mounting assembly 80 are essentially symmetrical about a vertical longitudinal axial plane.

It is important that the platform remain horizontal while it is being raised and lowered. Inclined ramps do not work for many racing cars with ground effects fairing which is extremely close to the ground.

Figure 7:
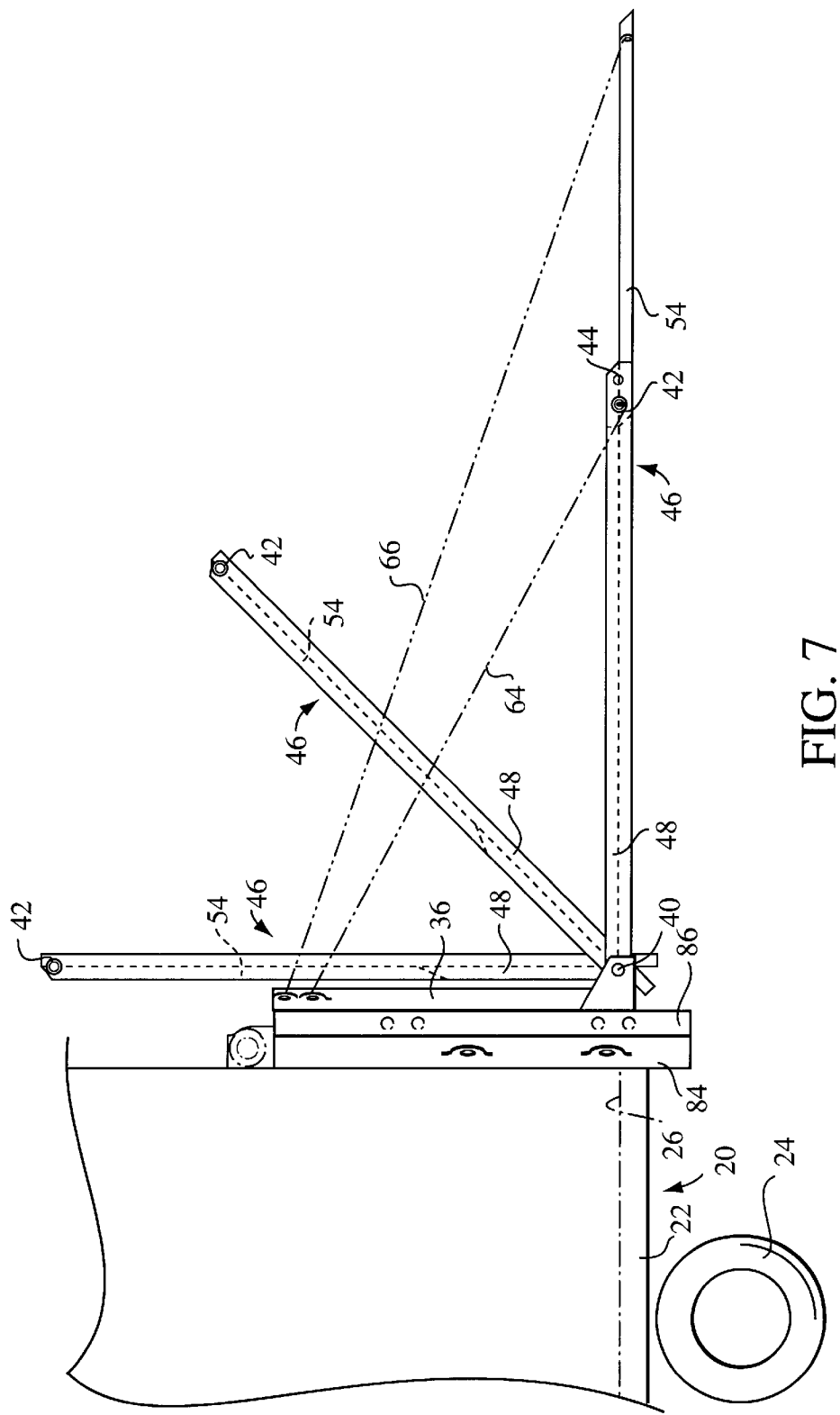
FIG. 7 is a view similar to FIG. 1, with the platform shown in three alternative positions: the horizontal, fully up position; a partially collapsed, angular position; and the fully collapsed, vertical, transport position.

As shown in FIG. 7, platform 46 is collapsible against the rear of carrier vehicle 20 for stowage or transport. By a method which will be described later, rear platform section 54 is folded about rear hinge 42 onto front platform section 48, so that treads 53 and 60 abut each other. Then platform sections 48 and 54 are rotated upward approximately 90 degrees about front hinge 40, past the intermediate position in which it is shown at 45 degrees from horizontal, to the approximately vertical transport position. The collapsed sections 48, 54 are secured to carrier vehicle 20 by straps or hasps (not shown) connecting the lower portion of mounting assembly 80 to the adjacent lower portion of platform 46. Folding of platform 46 at rear hinge 42 permits the vertical height of the folded platform to meet height limitations for highway vehicles.

FIGS. 8 to 13 show an embodiment of the invention which has extendible leg units 112 connected to platform 46a for rotation about axis 114. Leg units 112, which will be described later, are essentially jacks which allow platform 46a to be used as a standalone lift when detached from carrier vehicle 20, while still being elevatable to the fully down and fully up horizontal positions and still being collapsible against the rear of carrier vehicle 20 for transport. Platform assembly 30 is detached from mounting assembly 80 by removing bolt corresponding to bolts 39 shown in FIG. 1. When platform assembly 30 is in the detached mode, extending the legs of leg units 112 raises the platform to the fully up position.

In FIG. 8 platform 46a is in the fully up position and attached to carrier vehicle 20. In FIG. 9 platform 46a is in the fully up position but in the standalone mode, detached from the carrier vehicle. The standalone mode is desirable for several reasons. Space available at tracks may not be adequate to accommodate a carrier vehicle, and some tracks prohibit carrier vehicles from remaining in the crew areas. Also, the invention is useful at other locations having inadequate space for the carrier vehicle, for example, a garage, shop, or driveway. In FIGS. 10, 11, and 12 front platform section 48a, rear platform section 54a, and leg units 112 are shown progressively in intermediate stages of collapsing, and in FIG. 13 are shown completely collapsed against the rear of carrier vehicle 20.

FIG. 14 shows an embodiment of the invention in which the platform assembly includes platform 46a, in which front platform section 48b is in slideable engagement with rear platform section 54b. Unlike the embodiments previously described, platform 46b does not have a rear hinge. Instead of folding at a hinge, platform rear platform section 54b telescopes into front platform section 48b. FIG. 15 shows the platform assembly with platform 46b in the detached, fully down position. The sliding engagement provides increased rigidity of platform 46b, which may be desirable for certain uses of the invention, particularly advanced chassis tuning.

FIGS. 16 and 17 show leg unit or jack 112, which comprises housing 116, two-way piston 118, seals 120, 121, hydraulic fluid 122, extend oil feed 124, retract oil feed 126, leg 128, swiveling foot 130, and bracket 132. Leg 128 is in the retracted position in FIG. 16 and the extended position in FIG. 17. Each leg unit is essentially a hydraulic cylinder powered by a hydraulic system. When platform 46a or 46b is connected to the carrier vehicle, these cylinders are connected to the carrier vehicle's hydraulic system. When platform assembly 46a or 46b is detached, the cylinders are connected to a small self-contained hydraulic unit (not shown) mounted on it. The hydraulic system includes solenoid valves which are normally closed when energized and open to supply or vent hydraulic fluid, so that leg units 112 are failsafe. The pump supplying the hydraulic fluid to leg units 112 is preferably driven by a two-speed motor, so that the leg units can be driven at the higher speed to raise the platform quickly and at the lower speed to position the platform accurately, as will be necessary for precise leveling; alternatively, there can be two pumps—a pump with a higher volumetric output and a pump with a lower volumetric output.

As shown in FIGS. 18, 19, 20, and 21, each leg unit 112 is powered by small motor 134, which may be a small, high-torque hydraulic motor sold by Microprecision Textron under the registered trademark ROTAC. FIG. 18 shows leg unit 112 perpendicular to platform 46a, in the operating position. When the platform is folded for storage, leg unit 112 is rotated past the intermediate position shown in FIG. 20 to the transport position shown in FIG. 21, in which it is parallel to platform 46a.

FIG. 22 shows Rotac motor 134 with counterclockwise-rotating rotor 136, housing 138, seals 140, inlet 142, outlet 144, and hydraulic fluid 146.

The platform may be folded and unfolded by various methods. One method is to use motor-driven worm-and-sector gear units at the front and rear hinges. At the rear hinge, for example, a sector gear outside of each rear platform side member is fixed to that side member, centered on the hinge, and the motor, shaft, and worm gear are mounted on the outside of each front platform side member. The unit may extend above the side member, but should not extend below or inward of it. Similar units are employed at the front hinge in a similar fashion. This method permits the rear platform section to be folded against the front platform section either by clockwise or counterclockwise rotation about the rear hinge. Another method is to use front and rear cables which, instead of being fixedly attached to the top of the platform's vertical rail, are connected there by a suitable pulley arrangement to independent motor-driven winches. Like the first method, this method permits either clockwise or counterclockwise rotation about the rear hinge. A third method, which requires less expensive equipment but is slower, is to use grab chains about 23 inches long and holding chains about 100 inches long whose ends are connected to the grab chain rings and the holding chain rings, respectively. This method will be described in terms of folding up the platform, it being understood that the reverse sequence is used to unfold the platform. First, with the platform in the fully up position, the jacks, jack clips, and wheel stops are removed, the rear platform section is manually rotated approximately 180 degrees about the rear hinge and folded back on the front platform section. Then the grab chains are tensioned and the hooks at their ends hook the nearby front chain. The front hinge is lowered to the fully down position, causing the front chains to buckle at the hooked point and elevating the rear hinge. Next, the holding chains, which pass through keyhole-shaped openings in conventional chain length-adjusting fittings fastened to the front platform sections near the rear hinge, are tensioned and locked in the fitting, the grab chain hook is removed, and the front hinge is raised to the fully up position. Next, the hook of the grab chain is hooked over the front chain, and the front hinge is raised to the fully up position. This folds the platform sections to the upright position.

The inventive system enables the car and the platform to be transported together in a single carrier vehicle of conventional, highway-legal dimensions, thereby eliminating the need for an additional carrier vehicle, an additional driver, and the attendant expenses. In addition, the inventive system may be used to unload the car from the carrier vehicle and to load the car back into the carrier vehicle. In addition, the inventive system may be used as a lift at the race course to perform chassis tuning, safety, and other servicing procedures. As discussed earlier, the car may be serviced on the platform while the platform is attached to the carrier vehicle or while the platform is in a standalone mode, separate and spaced from the carrier vehicle. Also, the racing car may be serviced while the platform is in either a fully elevated position or a partially elevated position. These functions, with the exception of chassis tuning, are equally well suited to vehicles other than racing cars, for example antique cars being transported to shows, exhibitions, rallies, and the like.

Of course, when a car is supported on an elevated platform according to the invention, it is possible to unload its suspension if desired. For example, I have found it easy to put a scissors jack on the platform and jack up a wheel to change a tire.

The chassis tuning, safety, and servicing procedures discussed thus far have corresponded to procedures which have been performed using a conventional lift to elevate a car. I believe, however, that the invention, and the speed and convenience it provides, enables new procedures to be performed, either at a track or elsewhere.

One category of such new procedures could be called "advanced chassis tuning" or, more specifically, "chassis tuning with constantly loaded suspension". Essentially these procedures are based on the concept of substituting the elevated platform for a floor, so that chassis tuning procedures can be performed simultaneously with measuring the effects caused by the procedures. For example, weighing simultaneously the four wheels of a racing vehicle is a customary way to measure these effects. For example, Kroll et al. U.S. Pat. No. 5,232,064 discloses portable scales for weighing wheels of racing cars, and it is known that scales of this type may be arranged in a spaced relationship in a fixture which lies on the ground.

Such scales may be placed on the treads of the present invention, so that the chassis may be tuned while the car is being weighed. The embodiment in which the platform sections slideably engage each other is intended to achieve increased rigidity necessary for such new procedures. Another measure that will increase rigidity without adding undue weight is using, in the platform structure, aluminum extrusions which have a box-like cross-section, probably with internal ribs and/or recesses for receiving the folded leg units. Yet another such measure is applying reinforcing braces to the connection between the two platform sections, e.g., by bolting or locking on external braces or providing pivoting locking braces which remain attached to the platform structure. The leg units described above are intended to provide the leveling control necessary for such advanced chassis tuning.

Another way to provide a high degree of rigidity for accurate measurements, while retaining at least some of the advantages of chassis tuning with a loaded suspension, is to perform the chassis tuning when the platform is at the fully up position, then lower the platform to the ground for precise measurements with the platform supported by low, stable, rigid, previously leveled devices which in turn are supported by the ground. This process, though not allowing simultaneous chassis tuning and measuring, allows the measuring to be performed without unloading the suspension.

Another technique which can be used in chassis tuning on the platform according to the invention is the use of a non-extensible cable or another tensioned, rigid link connecting the undercarriage of the car to the platform. By adjusting and accurately controlling the tension, various dynamic loads the car will encounter on the track can be simulated.

The inventive method is not limited to platforms which are cantilevered to the carrier vehicle when being raised and lowered for loading and unloading, platforms which comprise sections movable with respect to each other, or platforms which are transported in a collapsed position at the rear of the carrier vehicle.

For example, the inventive method may be carried out on different apparatus whereby the car and platform are loaded and unloaded together, with the tires of the car supported by the platform. One way of achieving this is to provide the platform as an elevatable component of a motorized, steerable pallet for the racing car. The pallet, with the car supported on it, would have either wheels with pneumatic tires or tracks similar to those of a snowmobile, and would be driven into and out of the carrier vehicle via an inclined ramp. To avoid the fairing clearance problem mentioned above, the wheels of the pallet could be disposed or deployable at the bottom of the jack, so that the pallet is partially elevated in stilt-like fashion during loading and unloading to provide clearance between the pallet and bed at the top and bottom of the ramp. Alternatively, the rear wheels could extend all the way to the ground, in stilt-like fashion, while the pallet and car extend partly out of the rear of the carrier vehicle, with rollers or slides on the pallet between its wheels to support the pallet for movement along the rearmost portion of the bed of the carrier vehicle.

As an alternative to both the cantilevered platform and the platform which is a component of a motorized, steerable pallet, the car may be transported in the carrier vehicle without being supported by the platform. For example, the platform could be stored in the carrier vehicle beneath a car-supporting floor, or on a floor or other support above the car.

The inventive method is not limited to platforms with legs which telescope or are otherwise extendible. When in the lifting configuration, the platform may, for example, be suspended by cable from pulleys on the upper portions of the legs, with one or more force-multiplying mechanisms tensioning the cables and elevating the platform.

It will be understood that, while presently preferred embodiments of the invention have been illustrated and described, the invention is not limited thereto, but may be otherwise variously embodied within the scope of the following claims. It will also be understood that the method claims are not intended to be limited to the particular sequence in which the method steps are listed therein, unless specifically stated therein or required by description set forth in the steps.

What is claimed is:

1. A method of handling and servicing, at a track or other race course, a racing car having an undercarriage and pneumatic tires, which method comprises the steps of
   (a) providing a platform which
      (i) will support the car by the tires in either an elevated horizontal position or a lowered horizontal position,
      (ii) has at least one access opening permitting access to the undercarriage of the car through the opening,
      (iii) has legs for supporting the platform at varying distances from the ground, and
      (iv) is disposed, along with the car, in a wheeled carrier vehicle,
   (b) transporting the platform and the car, together in the carrier vehicle, to the course,
   (c) unloading the car from the carrier vehicle by
      (i) moving the platform and the car, from a transport position, rearward and downward to a horizontal, ground position in which the platform is supported by the ground and the car is resting on the platform, and
      (ii) rolling the car off the platform onto the ground,
   (d) driving the car on the course a first time,
   (e) servicing the undercarriage of the car at the course, after said driving, by
      (i) rolling the car from the ground onto the platform in the ground position, so that the tires of the racing car are supported by surfaces on the platform,
      (ii) raising the platform to an elevated position, with the legs resting on the ground and the car supported by the tires on the platform,
      (iii) working on or inspecting the undercarriage of the car through the access opening,
      (iv) lowering the platform to the ground position, and
      (v) rolling the car off the platform onto the ground, and
   (f) driving the car on the course a second time, after said servicing.

2. The method according to claim 1 wherein during the "servicing" step the platform is spaced from the ground by a distance which allows the work or inspection to be performed by a person whose upper body is off the ground and who has access with both hands to any place on the undercarriage.

3. The method according to claim 1 wherein during the "servicing" step the platform is supported by the legs.

4. The method according to claim 1 wherein, after the car has been driven of the course a second time,
   (a) the car is loaded into the carrier vehicle, is a transport position, by rolling the car from the ground onto the platform in a horizontal position is which the platform is supported by the ground, and
   (b) the platform and the car are moved forward and upward into the carrier the carrier vehicle.

5. A method of handling and servicing, at a track or other race course, a racing car having an undercarriage and pneumatic tires, which method comprises the steps of
   (a) providing a platform which
      (i) when free-standing will support the car by the tires in either an elevated horizontal position or a lowered horizontal position,
      (ii) has at least one access opening permitting access to the undercarriage of the car through the opening,
      (iii) has legs for supporting the platform at varying distances from the ground, and
      (iv) is disposed, along with the car, in a wheeled carrier vehicle which has transported the platform and the car,
   (b) transporting the platform and the car, together in the carrier vehicle, to the course,
   (c) unloading the car from the carrier vehicle by
      (i) moving the platform and the car, from a transport position, rearward and downward to a horizontal, ground position in which the platform is supported by the ground and the car is resting on the platform,
      (ii) separating the platform from the carrier vehicle, and
      (iii) rolling the car off the platform onto the ground,
   (d) driving the car on the course a first time,
   (e) servicing the undercarriage of the car at the course, after said driving, by
      (i) rolling the car from the ground onto the platform in the ground position, so that the tires of the racing car are supported by surfaces on the platform,
      (ii) raising the platform to an elevated position, with the legs resting on the ground and the car supported by the tires on the platform,
      (iii) working on or inspecting the undercarriage of the car through the access opening,
      (iv) lowering the platform to the ground position, and
      (v) rolling the car off the platform onto the ground, and
   (f) driving the car on the course a second time, after said servicing.

6. The method according to claim 5 wherein during the "servicing" step the platform is spaced from the ground by a distance which allows the work or inspection to be performed by a person whose upper body is off the ground and who has access with both hands to any place on the undercarriage.

7. The method according to claim 5 wherein during the "servicing" step the platform is supported by the legs.

8. The method according to claim 5 wherein the object of the "servicing" step is to improve handling characteristics of the car and wherein during the "servicing" step the suspension of the car is tuned by at least (a) making a change to the car which alters one or more of the car's handling characteristics, and
   (b) sensing downward forces exerted by the tires on the tire-supporting surfaces by weighing the car on scales between the platform and the tires.

9. The method according to claim 8 wherein the change is selected from the group consisting of driver weight, fuel weight, fuel distribution, height of the car's chassis with respect to the surfaces, tire pressure, and forces simulating forces resulting from braking, acceleration, or steering.

10. The method according to claim 8 wherein there are two steps of "sensing" the downward forces exerted by the tires on the platform, a first step prior to the step of "making a change" and a second step after the step of making a change.

11. The method according to claim 8 wherein the platform, during the "servicing" step, is in a lowered position and is supported below each tire-supporting surface by solid members which in turn are supported by the ground.

12. The method according to claim 8 wherein, while the "sensing" step is being performed, a member connecting the car's undercarriage to the platform is in tension and is applying a downward force to the car to replicate forces the car will experience while racing.

13. The method according to claim 5 wherein the object of the "servicing" step is to improve handling characteristics of the car and wherein (a) as a result of the step of "driving the car on the course a first time", there is deemed to be a need for tuning the suspension of the car,
   (b) during the "servicing" step the suspension of the car is tuned by making a change to the car which alters one or more of the car's handling characteristics, and
   (c) during the step of "driving the car on the course a second time", said change is evaluated.

14. The method according to claim 5 wherein, after the car has been driven on the course a second time, (a) the car is loaded into the carrier vehicle, in a transport position, by rolling the car from the ground onto the platform in a horizontal position is which the platform is supported by the ground, and
   (b) the platform and the car are moved forward and upward into the carrier the carrier vehicle.

* * * * *